April 28, 1970      G. PORTELLI      3,508,297
APPARATUS FOR CONTINUOUS PRODUCTION OF REINFORCED CONDUIT
Filed Jan. 10, 1968
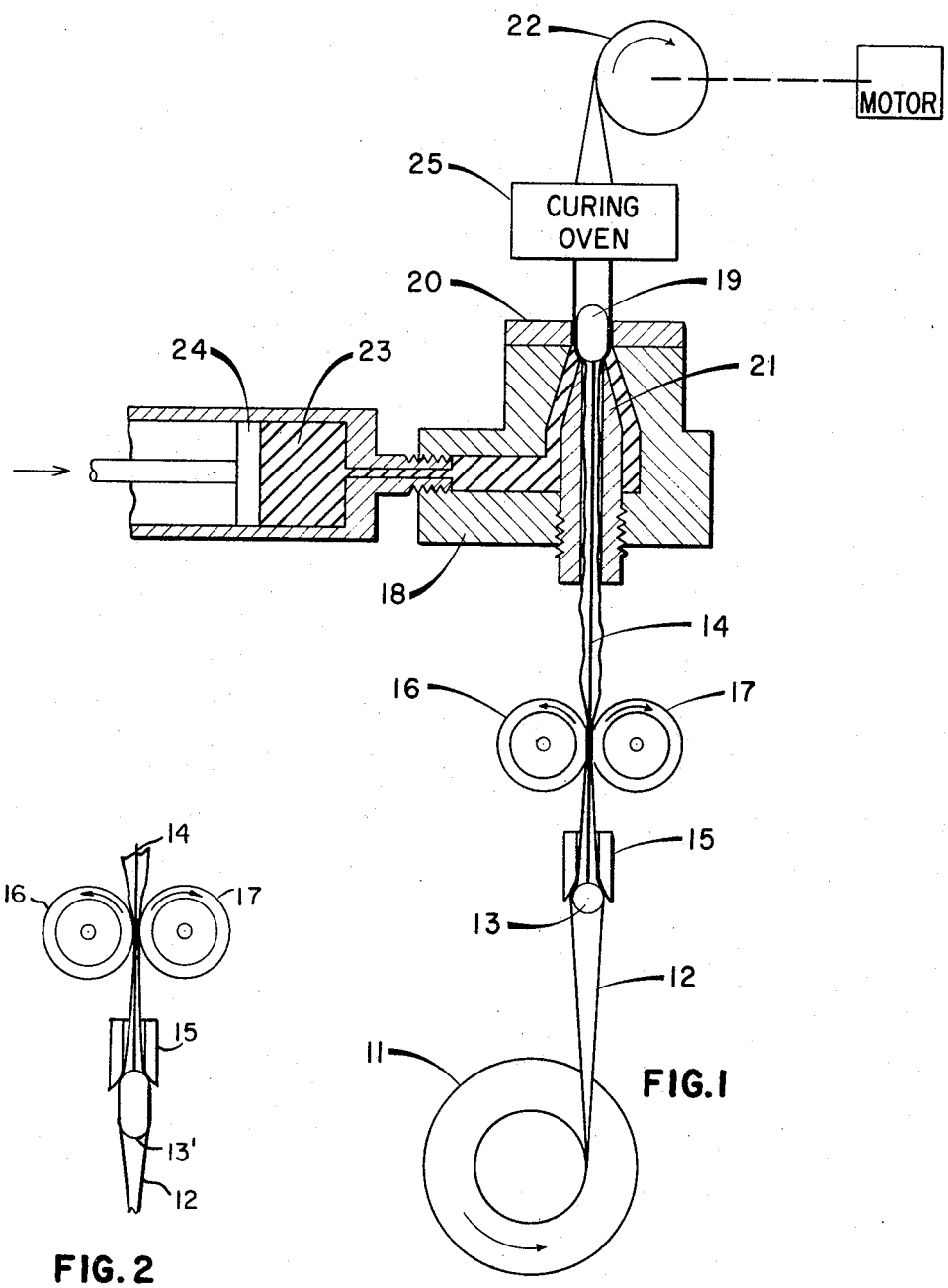
INVENTOR
GAVINO PORTELLI

United States Patent Office 3,508,297
Patented Apr. 28, 1970

3,508,297
APPARATUS FOR CONTINUOUS PRODUCTION OF REINFORCED CONDUIT
Gavino Portelli, Feyzin, France, assignor to Societe Industrielle des Silicones, Paris, France
Filed Jan. 10, 1968, Ser. No. 696,844
Int. Cl. B29d 23/05
U.S. Cl. 18—13                 5 Claims

ABSTRACT OF THE DISCLOSURE

Extrusion apparatus for forming reinforced tubing of curable plastic or elastomeric materials, the apparatus comprising a cylindrical extruder head through which a tubular reinforcement fabric is passed, and a generally cylindrical mandrel positioned within the extruder head. The mandrel is held in place within the head by a wire which is also affixed to a ball placed inside the tubular fabric and held there by use of a fixed ring placed rearwardly of the head and through which the tubular fabric passes. The ring has an entrance portion of gradually decreasing diameter in the direction of fabric movement, the minimum diameter being less than that of the ball.

BACKGROUND OF THE INVENTION

The present invention relates to an apparatus for the continuous fabrication of tubular conduits by extrusion of plastic or elastomeric materials, and more particularly to the extrusion of such materials on tubular reinforcing fabrics.

There exist a number of processes for fabricating tubes consisting of a reinforcement fabric sheathed with plastic or elastomeric material. An example of such a process comprises dip-coating the fabric which may be glass fiber, for example, in a dispersion of elastomer or plastic with which it is to be imbedded. These processes give results which are in many cases satisfactory, but which necessitate complex equipment such as soaking vats, drain towers, and the like.

It is also known that reinforced conduits may be fabricated by imbedding the fabric by means of an extrusion apparatus using a conventional extruder carrying a right-angle crosshead. The disadvantage of this process is that it permits only the formation of the tube containing reinforcement sufficiently rigid so that it is not deformed during the extrusion process. Thus, the range of materials which can be used in this process is restricted.

A further process is described in French Patent 1,315,-178, filed Dec. 7, 1961, which process consists of guiding the braid to be sheathed into the crosshead of an extruder and during extrusion making it slip over a rod disposed interiorly of the tubing. The guide rod is curved around rolls mounted on a fixed base, preferably the base of the extruder. This apparatus, while permitting continuous fabrication, does not permit, except at the cost of numerous difficulties, the extrusion of large diameter tubes or those having, for example, a flexible reinforcement of fiber glass which is loosely braided.

SUMMARY OF THE INVENTION

It is an object of the present invention to provide an extrusion apparatus for making reinforced tubing which apparatus is adaptable for use with any size or type of reinforcement fabric of a non-rigid nature.

In particular, according to the present invention, the disadvantages of the prior art are eliminated by providing in combination with an extruder head and means for supplying a tubular reinforcing fabric, the extruder head having a cylindrical mandrel which has a diameter substantially equal to the desired interior diameter of the reinforced tubing, a ring mounted in a position such that it surrounds the reinforcing fabric prior to entry of the fabric into the extruder head. A staying member which may be ball-shaped is held in place by the ring, and a holding means of reduced diameter interconnects the staying member and the mandrel to thereby hold the mandrel in place inside the extruder head as fabric is moved into and through the extruder head. While the size of the parts, must of course, vary with the size of the tubing being fabricated, this relatively simple construction allows the fabrication of virtually any size tubing using reinforcing material which may be of any type as long as it is somewhat flexible.

BRIEF DESCRIPTION OF THE DRAWING

Other objects and advantages of the present invention will become apparent as the invention becomes better understood by those skilled in the art from a reading of the following detailed description in connection with the accompanying drawing, in which FIG. 1 is a schematic view, partly in cross section, of an extrusion apparatus for producing reinforced tubing in accordance with the present invention and FIG. 2 is a fragmentary schematic view showing an alternative embodiment of a portion of the apparatus shown in FIG. 1.

DESCRIPTION OF THE PREFERRED EMBODIMENT

Referring now to the drawing, there is shown a supply reel 11 containing thereon a quantity of tubular reinforcement 12 which may be, for example, constructed of braided glass fibers. Positioned inside the tubing a distance away from the reel 11 is a staying member 13 which may, for example, be ball-shaped as shown in FIG. 1 or slightly elongated as desired. An elongated version of the staying member is designated by the numeral 13′ in FIG. 2. While a spherical member has been found satisfactory in some cases, a slightly oblong configuration is sometimes preferable. The staying member is made of hard material, such as stainless steel, for example, and is of a diameter approximating that of the tubular fabric or slightly greater.

Affixed to the staying member 13 is a holding means 14 of reduced diameter which may be, for example, a wire or cable welded to the staying member 13. The staying member 13 is held in place by means of a ring 15 surrounding the fabric 12, the ring also being of a material which is resistant to abrasion, again preferably stainless steel. The bore of the ring has a diameter slightly less than the diameter of the tubing and the diameter of the staying member 13. Additionally, at least the entrance portion of the ring is of gradually decreasing diameter in the direction of fabric movement, the minimum diameter being equal to that of the bore.

The ring is designed to hold the staying member 13 in place while allowing the tubular fabric to pass over the staying member and through the bore of the ring as it is pulled by means of a pair of pinch rollers 16, 17, positioned on opposite sides of the fabric between the ring and the extruder head 18. The pinch rollers 16, 17 have axes of rotation in a plane perpendicular to the axis of the braided tube and are deposed at a distance apart, such that the rotating peripheral surfaces of the two rollers provide secure friction contact with the fabric 12 to pull the fabric over the staying member 13 and through the ring 15. The pinch rollers 16 and 17 are driven by any suitable means, such as a pair of variable speed motors or gearing from a single motor. The peripheral surfaces of the rolls are made of elastic or plastic material to allow some deformation at their point of contact with the tubular fabric in order to prevent slippage.

The peripheral surface may be, for example, silicone rubber.

The braided tubing is then introduced into a conventional crosshead 18 provided on the extruder and passes over the cylindrical mandrel 19 connected to the other end of the holding means 14, which as previously stated, may be a wire which is also affixed to the staying member 13. Thus, the staying member 13 by virtue of wire 14 holds the mandrel 19 in place in the extruder head at the die plate 20 of the extruder. The length of the staying member or wire 14 is chosen to hold the mandrel 19 at the proper position in the extruder, and, if desired, suitable means for adjusting the spacing between the extruder and the ring 15 may be incorporated into the device. The ends of the mandrel 19 are machined in a manner such that the presence of edges is avoided, and the ends are preferably in the form of hemispheres. The diameter of the mandrel is substantially equal to the desired internal diameter of the reinforced tubing, and is therefore generally slightly less than that of the braided tubing.

While the diameter of the die 20 is chosen depending upon the diameter of the braided tube and the desired external diameter of the fabricated tubing, the torpedo 21 has an internal diameter approximating that of the braided tubing 12. Preferably the torpedo 21 is made in two halves to facilitate placement of the holding means 14. Aside from this, the torpedo is of a conventional design and is disposed as a means to permit the flowing of plastic material and its deposition on the braided tubing 12.

In operation, it is preferred to avoid stretching the braided tubing between the rollers 16, 17 and the extruder 18 by letting pleats develop at least along part of that space. This avoids excess pulling on the braided tubing, if for any reason the peripheral speed of the take-up reel 22 is greater than the speed of passage of the braided tubing between the staying member 13 and its retaining ring 15.

Material is fed into the extruder by conventional means, such as a cylinder 23 and piston 24 which forces the material to flow onto the braided tubing 12 over the mandrel 19. A curing oven 25 is preferably placed adjacent to the extruder 18 for immediately curing the extruded material whereupon the cured fabricated tubing is wound upon the take-up reel 22. Preferably the take-up reel 22 is positioned a sufficient distance away from the curing oven 25 to allow cooling of the fabricated material prior to winding.

The above-described apparatus allows fabrication of reinforced tubing without subjecting the braided tubing to excess pulling while forming it to the desired cylindrical form at the point where extrusion takes place. The circular cross section is attained by the presence in the center of the die of a mandrel having a diameter slightly less than that of the braided tubing. The mandrel, of course, is held in place by the staying member 13 and ring 15. The passage of the mandrel and its position, as well as the passages of the staying member and ring and their respective positions, permit a slipping and gliding of the braided tubing with little fricton.

The progression of the braided tubing is assured, on one hand, by the rotation of the wind-up reel 22 for the finished tubing, or by a suitable capstan which may be provided and, on the other hand, by the pair of pinch rollers 16, 17 which advance the reinforcement toward the crosshead. The relative speeds are regulated to insure the regularity of advancement. Furthermore, slack is allowed to develop between the rollers 16, 17 and the extruder 18 to minimize forces applied to the tubing in the extruder. This eliminates stretching of the braid and consequent diameter reduction. The holding means, of wire or the like, keeps the slack tubing in a substantially horizontal position.

It should be understood that one would not depart from the teaching of this invention if the elements, such as the mandrel, the staying member, and the holding member, are to be formed differently than those described herein. The mandrel can have, for example, a truncated form, and as heretofore mentioned. A thin tube or rigid rod could be substituted for the wire as the holding means binding the staying means to the mandrel. The extruder can be supplied with an inclined head. An essential imposed on the means of carrying out the extrusion on the reinforced tubing is provision for permitting gliding of the braided tubing at low friction to avoid ruptures and binding.

In a particular embodiment of the invention, which is purely illustrative and which should not be considered a limitation on the scope and spirit of the invention, a braid of fiber glass having a 4 mm. diameter was imbedded in an elastomeric silicone characterized by a Shore A hardness of 50, tensile strength at break of 52 kg. per cm.$^2$, and maximum elongation of 250%. The tubular braid wound on a supply reel was threaded over a spherical staying member 13 of 4 mm. diameter through a ring 15 having a diameter varying from 5 mm. to 3 mm. in the direction of travel of the braid and between a pair of pinch rollers 16 and 17 each having a metal cylindrical core 35 mm. in diameter and 16 mm. thick. The core was encompassed by a crown of silicone rubber of the same thickness bringing the external diameter of the roller to 52 mm. The distance between the axes of the two rollers was 50 mm. The two rollers were coupled by their axles and a system of gearing to a motor to provide equal rotations at all speeds. A piano wire having a 1 mm. diameter was bound at one end to the ball 13 and was threaded through a cylindrical billet of stainless steel of 4 mm. length and 3.7 mm. diameter having two hemispherical ends. A hole of 1.2 mm. diameter was pierced along the axis of the billet to permit fixation of the piano wire thereto. The billet was mounted to serve as mandrel 19. The ring 15 had an external diameter of 10 mm. and a length of 60 mm. and was milled to serve as a housing for the ball and to permit easy slippage of the tubing between the ball and ring. The ring was affixed to the extruder by a collar and supporting arms of metal. The head was a conventional crosshead furnished with a torpedo of 3.5 mm. internal diameter in the extremity at which the mandrel abutted. The die plate 20 had an internal diameter of 5.5 mm. After the braided tubing was threaded through the machine, the sheathed tube was moved at 5 meters per minute through the curing oven. The quantity of material sheathing the tubing produced a deposit of 0.5 mm. thickness. The tubing attained had a very regular character and possessed good resistance to pulling as well as wearing and good durability toward heat.

Other variations and modifications of the invention will become obvious to those skilled in the art of the as-described embodiments. It is therefore to be understood that within the scope of the appended claims, the invention may be used other than as specifically described.

That which is claimed is:
1. In extrusion apparatus for forming reinforced tubing of curable plastic or elastomeric materials, said apparatus having means for feeding tubular reinforcing fabric into an extruder head, means for embedding the fabric in the curable materials and means for conveying the resultant tubular composite out for the extruder head for curing, the improvement which comprises:
   a cylindrical mandrel having a diameter substantially equal to the desired internal diameter of said reinforced tubing,
   a ring mounted in a position such that it surrounds the reinforcing fabric prior to entry of the fabric into the extruder head, said ring having an entrance portion of gradually decreasing diameter in the direction of fabric movement,
   a staying member having a diameter approximating that of the tubular fabric and greater than the smallest diameter of said ring, said staying member being adapted to be held in place inside said fabric by said ring, and holding means of reduced diameter interconnecting said staying member and said mandrel, whereby said mandrel is held in place at a fixed predetermined distance from said staying member as fabric is moved into and through said extruder head.

2. Apparatus as defined in claim 1 wherein said holding means is a wire affixed substantially axially to both said staying member and said mandrel.

3. Apparatus as defined in claim 1 wherein said staying member is spherical.

4. Apparatus as defined in claim 1 wherein said staying member is oblong.

5. Apparatus as defined in claim 1 and further including a pair of pinch rollers positioned intermediate said ring and said mandrel for pulling said fabric through said ring and feeding it into said extruder head in slack condition.

References Cited

UNITED STATES PATENTS

| | | | |
|---|---|---|---|
| 2,874,411 | 2/1959 | Berquist | 18—13 |
| 2,903,743 | 9/1959 | Lysobey | 18—14 XR |
| 3,191,230 | 6/1965 | Ashton | 18—13 |
| 3,320,635 | 5/1967 | Zolotarevsky | 18—13 |
| 3,159,877 | 12/1964 | Orsini | 18—13 |

FOREIGN PATENTS 1,038,433  8/1966  Great Britain.

WILLIAM J. STEPHENSON, Primary Examiner